(No Model.)
E. V. CLEMENS.
PIPE HANGER.
No. 437,018. Patented Sept. 23, 1890.
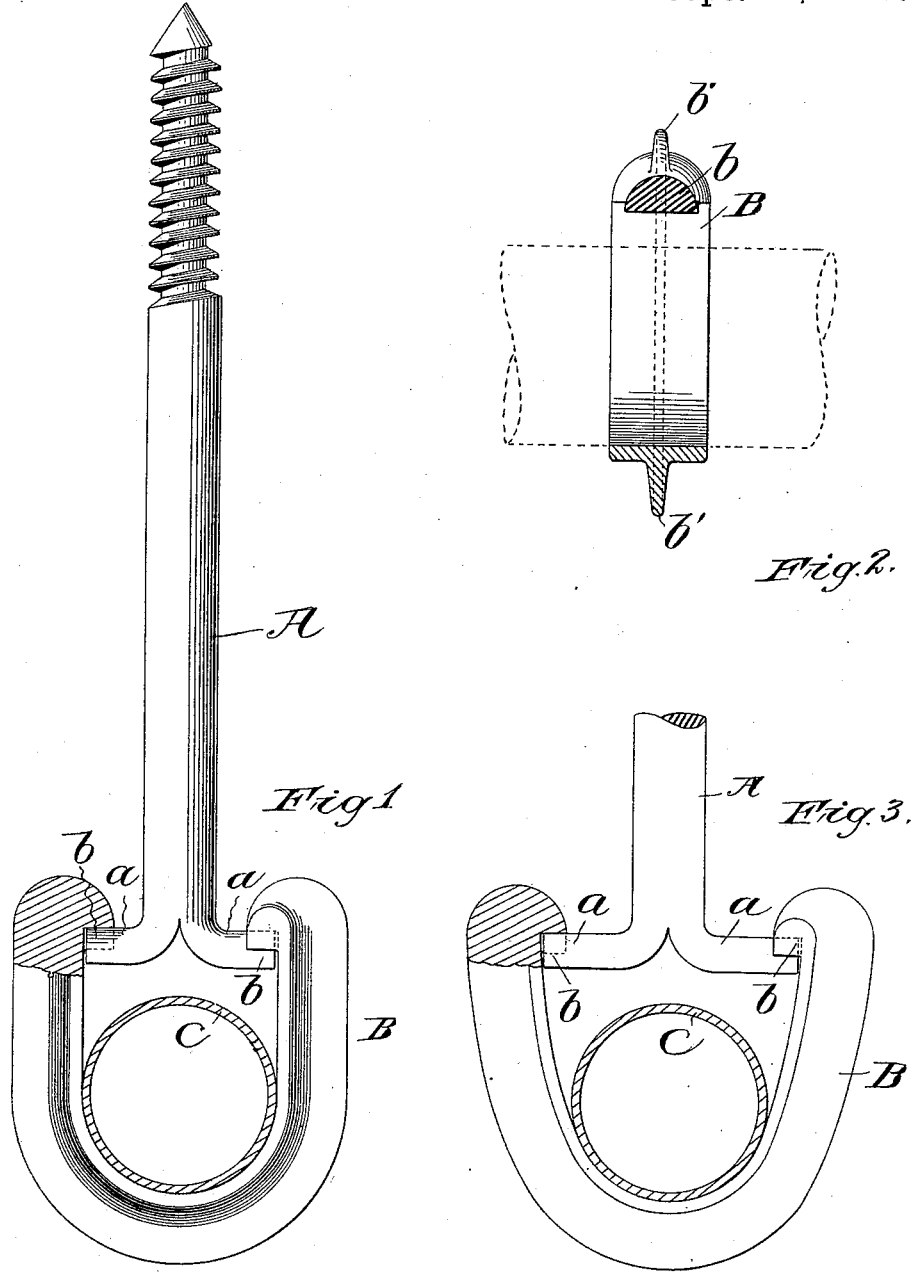
Attest:
C. W. Benjamin
L. T. Griffith
Inventor:
Earnist V. Clemens
By Banning & Morse
his Attorneys

UNITED STATES PATENT OFFICE.

ERNEST V. CLEMENS, OF NEW YORK, N. Y., ASSIGNOR TO THE DE LA VERGNE REFRIGERATING MACHINE COMPANY, OF NEW YORK.

PIPE-HANGER.

SPECIFICATION forming part of Letters Patent No. 437,018, dated September 23, 1890.

Application filed April 7, 1890. Serial No. 346,900. (No model.)

*To all whom it may concern:*

Be it known that I, ERNEST V. CLEMENS, a citizen of the United States, and a resident of the city of New York, county and State of New York, have invented certain new and useful Improvements in Pipe-Hangers, of which the following is such a full, clear, concise, and exact description as will enable others skilled in the art to which my invention appertains to make and use the same, reference being had to the accompanying drawings, forming part of this specification.

It is customary in refrigerating and other apparatus requiring a large amount of piping in a building to suspend many of the pipes from the ceilings of the rooms through which they pass. This has heretofore been done by securing bolts in the beams or structural parts above, such bolts being formed with square T-heads, to which were coupled metallic loops or hangers having angular bearings fitting over the arms forming the heads of the bolts. The suspension of the pipes by such form of hangers was a troublesome matter and effected a rigid attachment, not making provision for the contraction and expansion of the piping, except by bodily motion through the hanger.

The object of my invention is to provide a hanger which, while affording a firm support for the pipe will at the same time be easy of adjustment and have sufficient play or swing to allow for the movement incident to the contraction and expansion of the metal; and my invention consists in the construction hereinafter more fully described, and pointed out in the claims.

In the accompanying drawings, Figure 1 is a view in elevation, partially in section, of bolt and hanger embodying my improvement with cross-section of suspended pipe. Fig. 2 is a view in cross-section of the hanger proper, and is taken on the line $xx$ of Fig. 1, the suspended pipe being indicated by dotted lines. Fig. 3 represents a similar hanger, but with the inwardly-projected bearings wider apart to admit the hanger being slipped over the pipe. This form is convenient, as it avoids the necessity of passing the ends of the pipe through the hangers.

The support or lag-bolt A, usually with threaded end, as shown, adapting it to be screwed into a beam or rafter, is provided at its outer end or head with laterally-projecting arms $a\ a$, having rounded surfaces upon which rest the inwardly-projected rounded bearings $b\ b$ of the metallic loop or pipe-rest B for suspending the pipe C. The pipe-rest or hanger proper C, I preferably make by casting the metal into the form of a loop with a strengthening-rib $b'$.

It is readily seen that the rounded bearings admit of easy coupling, and also permit a swing or movement of the hanger sufficient to allow for contraction and expansion of the metal, which is of peculiar advantage when the pipes supported are liable to be subjected to extreme changes of temperature, as in refrigerating apparatus.

Having thus described my invention, what I claim as new, and desire to secure by Letters Patent, is—

1. A pipe-hanger consisting of a metallic loop or pipe-rest provided with inwardly-projected rounded bearings, in combination with a supporting-bolt having laterally-extended arms with rounded surfaces forming a seat for said bearings, substantially as described.

2. A pipe-hanger consisting of a metallic loop or pipe-rest provided with inwardly-projected rounded bearings having sufficient space between them for the entrance of a pipe, in combination with a supporting-bolt having laterally-extended arms with rounded surfaces forming a seat for said bearings, substantially as described.

ERNEST V. CLEMENS.

Witnesses:
A. FROEGMUNDT,
WM. J. SCHWEITZER.